June 27, 1944.  M. P. DE MOTTE  2,352,256
HYDRAULIC BACK-PRESSURE ARRESTER
Filed July 11, 1940  2 Sheets-Sheet 1

INVENTOR
MAURICE P. DE MOTTE
BY
ATTORNEY

June 27, 1944.    M. P. DE MOTTE    2,352,256
HYDRAULIC BACK-PRESSURE ARRESTER
Filed July 11, 1940    2 Sheets-Sheet 2
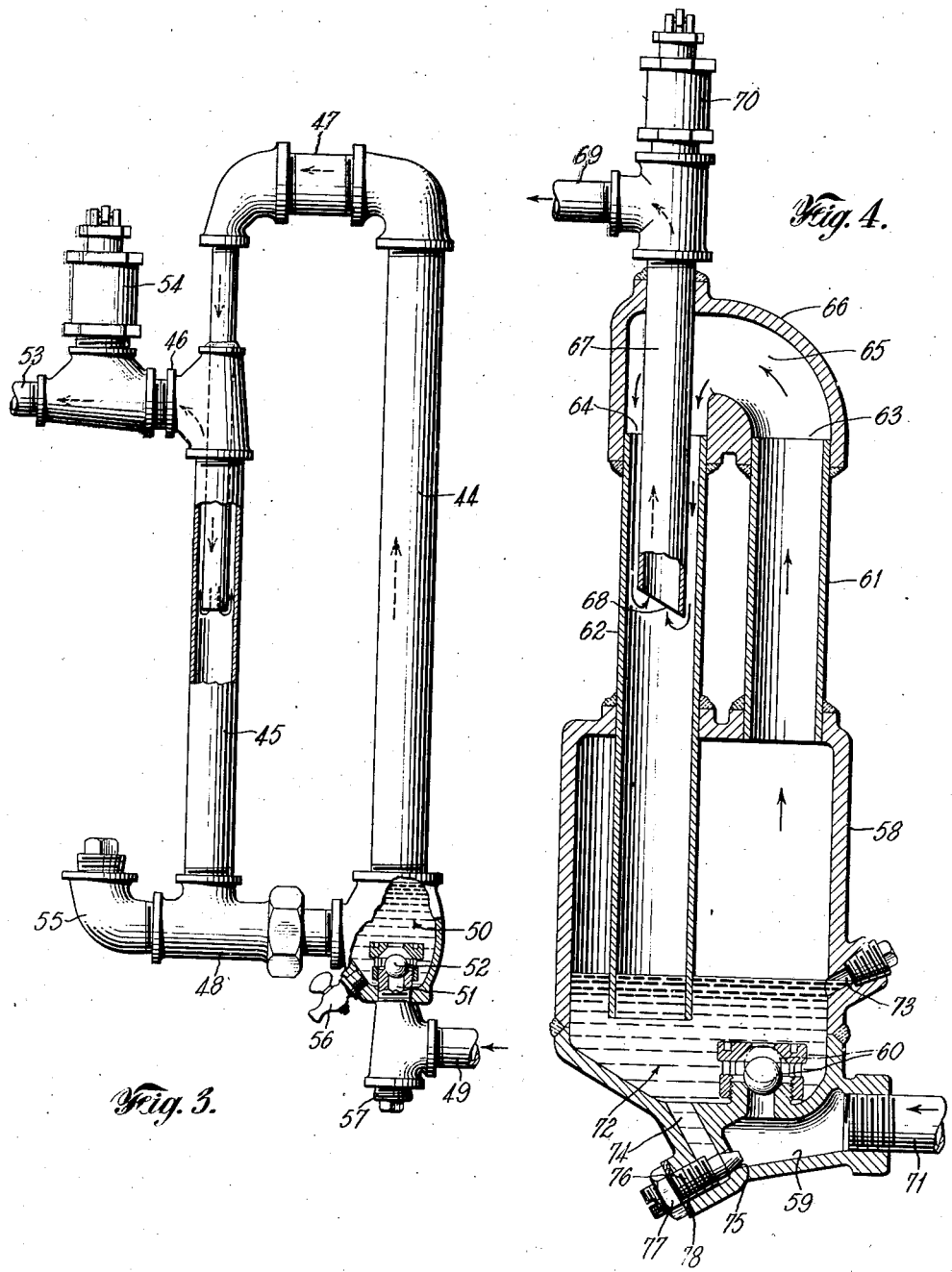
INVENTOR
MAURICE P. DE MOTTE
BY
ATTORNEY Patented June 27, 1944

2,352,256

UNITED STATES PATENT OFFICE 2,352,256

HYDRAULIC BACK-PRESSURE ARRESTER

Maurice P. De Motte, Indianapolis, Ind., assignor to Union Carbide and Carbon Corporation, a corporation of New York Application July 11, 1940, Serial No. 344,924

20 Claims. (Cl. 48—192)

This invention relates to hydraulic back-pressure arresters for use in piping systems for combustible gases, such as medium pressure acetylene, for example.

It is well known that back-flashes may occur occasionally in combustible gas piping systems, accompanied by the propagation of fire and/or an explosive wave backward through the mains. Such a back-flash is particularly dangerous in acetylene piping systems because acetylene gas frequently is combined with oxygen gas at the point of consumption, such as in a welding blowpipe, and a back-flash may cause the recession of oxygen gas through the acetylene gas mains. Obviously, if oxygen were permitted to recede to the acetylene generator, an explosive mixture might be formed in the generator which would be extremely dangerous if ignited.

Back-flashes usually are arrested before reaching the gas generator by means of devices comprising liquid seals and suitable check valves interposed in the gas conduits, which will permit the passage of gas freely in a normal direction, but which will prevent the reverse flow of gas beyond the arresting devices when a back-flash occurs. Prior hydraulic back-pressure arresters have not been wholly dependable because of the entrainment of liquid from the seal by gas bubbling through the liquid during normal operation, with a consequent gradual reduction in the quantity of liquid in the seal. Constant observation of the liquid level, and frequent additions of liquid, therefore, are necessary to maintain the efficiency of such an arrester. Furthermore, although water is the liquid most often employed for the seal, it sometimes is necessary to use more expensive liquids, such as ethylene glycol solutions, the loss of which entails a substantial monetary expense. Another disadvantage of prior hydraulic back-pressure arresters is the location of parts which may require frequent cleaning or repair, such as check valves and screens, in inaccessible places.

It is the principal object of the present invention, therefore, to provide hydraulic back-pressure arresters which shall be efficient and dependable in operation. Another object is to provide a hydraulic back-pressure arrester, the fundamental principles of which may be applied to arresters designed for unusually high gas capacities as well as to arresters designed for low gas capacity. Other objects are the provision of a hydraulic back-pressure arrester in which liquid entrainment during the normal passage of gas through the liquid seal is reduced to a minimum; in which entrained liquid is effectively removed from the gas before it leaves the arrester, and is returned to the liquid seal; in which parts which may require cleaning or repair are easily accessible; and which is simple, light, and compact yet rugged in construction, as well as inexpensive to manufacture and maintain.

The above and other objects, and the novel features of the invention, will become apparent from the following description taken with the accompanying drawings, in which:

Figs. 3 and 4 are side elevational views, partly broken away and in section, of two other types of hydraulic back-pressure arresters embodying the invention.

Figures 1, 2:
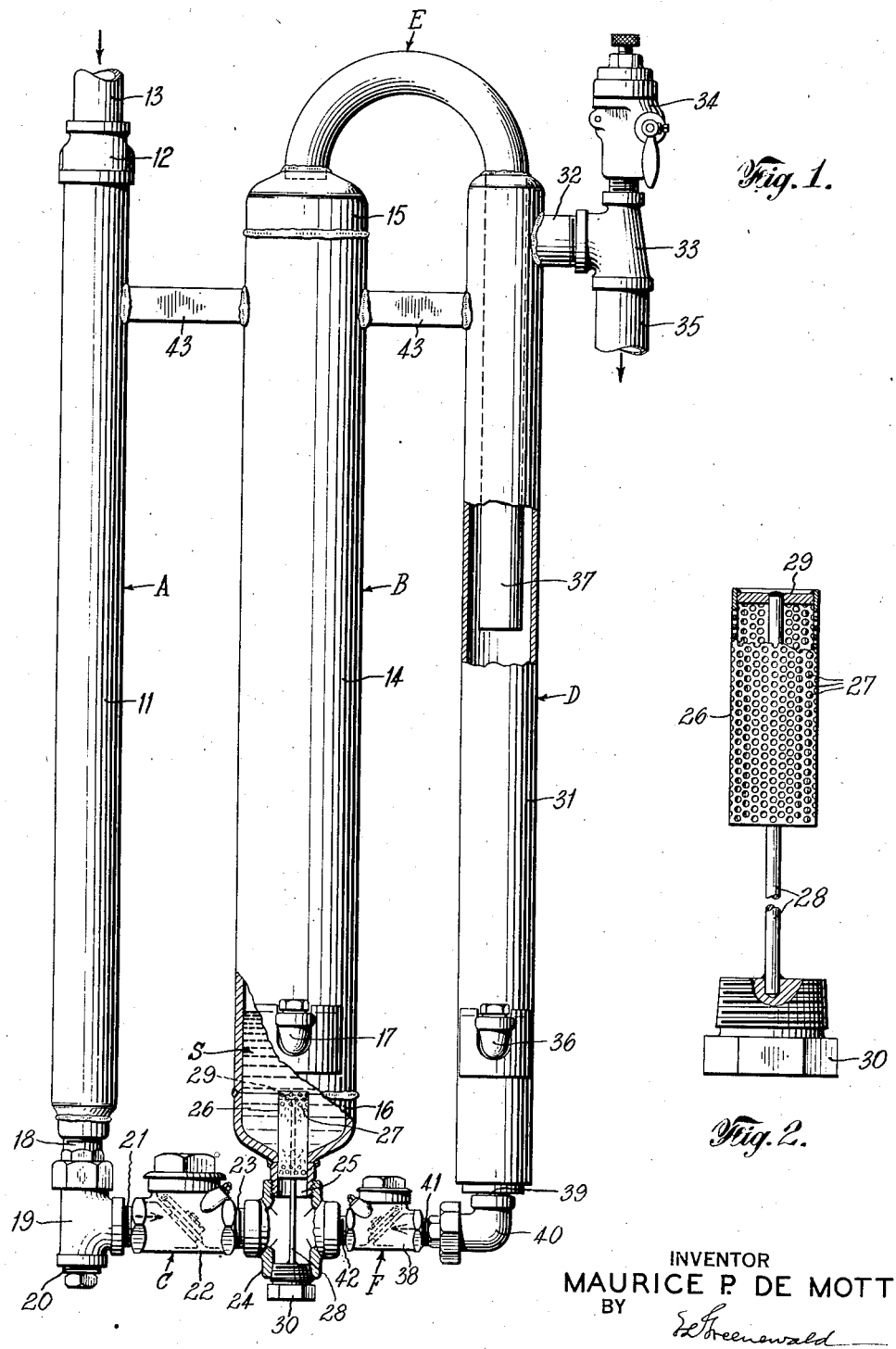
Fig. 1 is a side elevational view, partly broken away and in section, of one type of hydraulic back-pressure arrester embodying the invention.
Fig. 2 is an enlarged elevational view, partly broken away and in section, of a part of the apparatus of Fig. 1.

As shown in Fig. 1, the hydraulic back-pressure arrester of the invention comprises an inlet reservoir A having an inlet for gas and an outlet below the inlet; a main reservoir B adapted to contain a liquid seal and having an outlet for gas spaced from the liquid seal above the normal liquid level, and an inlet for gas below the outlet and below the normal liquid level; a conduit C for gas, including a check valve normally open during the passage of gas and adapted to close under the influence of back-pressure, communicating between the outlet of the inlet reservoir A and the inlet of the main reservoir B and controlling the inlet to the latter; an outlet reservoir or liquid trap D having a gas outlet and a liquid outlet; a second conduit E for gas communicating between the outlet of the main reservoir B and the liquid trap D; and a third conduit F for liquid, including a normally closed check valve for preventing liquid flow from the reservoir B to the trap D, communicating between the liquid outlet of the trap D and the main reservoir B.

More specifically, the inlet reservoir A comprises a long vertical steel pipe 11, to the top or inlet end of which is threaded a suitable coupling 12 adapted to be threaded to a gas main 13.

The main water seal reservoir B, which has approximately the same length as the inlet reservoir A and is arranged in spaced parallel relation to the inlet reservoir, comprises a long vertical pipe 14 of greater diameter than the inlet reservoir A and having hollow caps 15 and 16 welded to its upper and lower ends respectively. A liquid seal S is provided in the main reservoir B intermediate the inlet and outlet thereof by filling the reservoir with water or another suitable liquid to a predetermined normal level through a pipe elbow 17 welded to the side of the pipe 14 and closed by a removable plug.

Gas, such as acetylene, enters the hydraulic back-pressure arrester from the main 13 through the inlet at the top of the inlet reservoir A, flows downwardly, and leaves the inlet reservoir through a nipple 18 threaded into the outlet at the bottom of the inlet reservoir, and also connected to the upper end of the vertically arranged through-passage of a pipe T 19, the opposite lower end of which passage provides a clean-out opening closed by a pipe plug 20. Gas then flows to the main reservoir B through the horizontally arranged branch passage of the pipe T 19, a nipple 21 connecting the pipe T to one side of an externally located standard swing check valve 22 adapted to be held open by the normal flow of gas and to be closed by back-pressure, a nipple 23 connecting the other side of the check valve 22 to one side of the horizontally arranged passage of a pipe cross 24 arranged immediately below the reservoir B, and a vertical nipple 25 threaded into the upper end of the vertically arranged passage of the pipe cross 24 and made integral with the bottom of the main reservoir B by welding to the cap 16 around an opening in the cap.

For the purpose of breaking up the stream of gas passing upwardly through the water seal to reduce liquid entrainment, a hollow cylindrical vertically arranged screen 26, having an open end and a closed end, as shown in detail in Fig. 2, is arranged with its open end in the nipple 25 and extends well up into the reservoir B. Gas entering the open end of the screen 26 leaves through the numerous perforations 27 in its side walls and passes upwardly through the liquid seal in many well dispersed small bubbles, thus preventing excessive agitation and entrainment of the liquid. A support rod 28 fits within a centrally arranged bore in, and is welded to, an imperforate closure plate 29 which is fitted within the upper end of the screen 26 and is welded at its edges to the screen. The support rod 28 extends vertically downwardly through the screen 26 and the vertical passage or opening of the pipe cross 24, which is aligned with the inlet to the reservoir B. At its lower end the rod 28 fits within a bore in, and is welded to, a plug 30 threaded into the lower end of the vertical passage of the pipe cross 24. When it is desired to clean or repair the screen 26, or to drain the liquid from the reservoir B, the plug 30 is removed from the pipe cross 24, and the unitary assembly of the plug, support rod, and screen is withdrawn through the nipple 25 and the vertical pipe cross passage.

The outlet reservoir or liquid trap D, which is arranged outside of and in parallel spaced relation to the reservoirs A and B, comprises a long vertical pipe 31, to one side of which, adjacent to the top of the pipe, is welded a gas outlet nipple or conduit 32 which communicates at one end with the interior of the reservoir, and at its other end is threaded into the horizontally arranged branch passage of a pipe T 33. The pipe T 33 carries at the upper end of its vertically arranged through-passage a pressure relief valve 34 of standard construction, and at its opposite end is adapted to connect with a gas main 35. The outlet reservoir D may be filled with liquid, such as water, to a predetermined level substantially the same as the liquid level in the main reservoir B, through a pipe elbow 36 welded to the side of the pipe 31 and closed by a removable pipe plug.

Gas is conducted from the main reservoir B through a U-shaped conduit E, opening from the main reservoir at a point spaced from the liquid containing portion thereof. The conduit E has a short leg which extends for a short distance into the main reservoir B through an opening in the top of the cap 15 and is welded to the cap around the opening. The other leg 37 of the conduit E, which is relatively long, passes through an opening in the top of the outlet reservoir D, is welded to the top of the reservoir around the opening, and extends downwardly for a considerable distance below the outlet nipple 32 in spaced relation to the inner wall of reservoir D. Thus, the direction of flow of gas leaving the open lower end of the conduit E is abruptly reversed and the velocity reduced during its passage to the outlet nipple 32, so that most of the entrained liquid drops out of suspension and collects in the reservoir D, thereby raising the level of the liquid seal therein.

As the level of the liquid seal in the outlet reservoir or trap D rises gradually, the pressure exerted by the liquid column increases until the pressure exerted in the conduit F on the side of a normally closed standard swing check valve 38 toward the outlet reservoir D sufficiently overbalances the pressure exerted on the opposite side of the check valve, by the column of liquid in the main reservoir B, to open the check valve. Liquid then flows from the trap D to the inlet of the main reservoir B through a nipple 39 secured in the bottom of the trap and connected to a pipe elbow 40, a nipple 41 connecting the pipe elbow to one side of the externally located check valve 38, and a nipple 42 connecting the other side of the check valve 38 to the horizontal passage of the pipe cross 24. When the level of the liquid seal in the main reservoir B rises to such a height that the pressure exerted thereby on the side of the check valve 38 toward the reservoir B overbalances the pressure on its other side, the check valve swings closed.

Upon the occurrence of a back-flash, the burning gas and/or explosion wave recede through the gas main 35 at a high velocity to the reservoirs D and B where their passage is arrested by the water seals, and any burning gas is extinguished. The pressure exerted on the two liquid seals causes the check valve 22 in the conduit C to swing shut to retard as much as possible the passage of liquid back toward the generator. As such check valves almost invariably leak to some extent, however, and as the inertia of the check valve prevents instantaneous closing, some liquid almost always passes the check valve and accumulates in the bottom of the inlet reservoir A, which thus insures the maintenance of the liquid seals by preventing the flow of water all the way back to the generator. Excessive gas pressure in the arrester is relieved by automatically venting gas through the pressure relief valve 34. When normal operation is resumed, the gas entering the inlet reservoir A forces any collected water back to the main reservoir B. If a large quantity of liquid has been expelled from the outlet reservoir D by the pressure of the back-flash, the seal may be replenished through the pipe elbow 36, although enough liquid usually remains to provide a seal which will build up to a higher level as entrained liquid is trapped out of the normally flowing gas.

Proper positioning of the three long vertical reservoirs A, B, and D in spaced parallel relation to each other is maintained by the conduits C and F, and by means of horizontal braces 43, near the top of the arrester, welded to the respective reservoirs.

The form of the hydraulic back-pressure arrester of the invention described above is particularly valuable for unusually large rates of gas flow. For example, arresters constructed as described have been used successfully with acetylene flow rates as high as 6000 cu. ft./hr. Two other types of hydraulic back-pressure arresters according to the present invention, which are particularly adaptable for lower rates of gas flow, are shown in Figs. 3 and 4.

Fig. 3 shows a hydraulic back-pressure arrester which may be constructed cheaply and simply from standard pipe fittings. The arrester comprises a vertical main reservoir 44 having an inlet for gas adjacent to its lower end, and a vertical outlet chamber or liquid trap 45 outside of the main reservoir having a gas outlet 46 in its side wall adjacent to its upper end. A gas conduit 47, which is secured to the upper ends of both the reservoir 44 and the chamber 45, has a long leg which extends downwardly within the chamber in spaced relation to its internal wall, for conducting gas from a portion of the reservoir spaced from the liquid containing portion. The long leg of the conduit 47 has a downwardly opening exit a substantial distance below the outlet 46 arranged to discharge gas downwardly in the chamber 45. A liquid conduit 48 leads from the bottom of the chamber 45 to the reservoir 44 adjacent to the lower end of the latter and below the liquid level therein to drain trapped liquid from the chamber back to the reservoir.

Gas, such as acetylene from a generator, is conducted through a main 49 to the arrester and discharged upwardly through the body of liquid 50 in the reservoir 44 from the inlet 51, which is provided with a captured-ball check valve 52. Gas which rises through the liquid seal 50 passes to the top of the reservoir 44, enters the conduit 47, and is discharged downwardly into the chamber 45 at reduced velocity. The gas then reverses its direction of flow abruptly and flows upwardly to and through the outlet 46 to the main 53, in which a pressure relief valve 54 is connected. When the gas at reduced velocity abruptly reverses its direction of flow in the chamber 45, most of the entrained liquid drops out of suspension and falls down to the bottom of the chamber, from which it may pass back to the reservoir 44 through the conduit 48.

A street elbow 55 threaded into one end of the liquid conduit 48, and normally closed by a removable pipe plug, provides an opening or filling spout the upper level of which is higher than the conduit, whereby the chamber 45 and the reservoir 44 may be filled with a liquid, such as water, to the desired normal level, which should always be maintained higher than the top of the passage through the conduit 48 to prevent the by-passing of gas through the conduit 48 to the chamber 45. A drain cock 56 in the bottom of the reservoir 44 provides for draining the liquid from the reservoir, the conduit 48, and the chamber 45; and a plug 57 in the main 49 provides for draining any accumulated liquid from the main.

The arrester of Fig. 3 resists the passage of a back-flash in a similar manner to the arrester of Fig. 1. When a back-flash occurs, the check valve 52 automatically closes because of the increased pressure, and the liquid seal 50 prevents passage of the back-flash past the arrester to the generator. If the pressure rises above a predetermined maximum, the relief valve 54 vents the gases to the atmosphere.

Fig. 4 shows another type of hydraulic back-pressure arrester which is especially adapted for low rates of gas flow. A reservoir or container 58, which is adapted to contain a body of liquid at a normal level, comprises two castings joined together as by welding (or a single casting, if desired) having an inlet passage 59 opening into its lower end. A captured-ball check valve 60 is positioned over the inlet and adapted to close the inlet except when gas is passing through the arrester in a normal direction. Two apertures extend through the top wall of the container 58, into one of which is fitted the lower end of a vertical outlet tube 61 which terminates well above the normal liquid level, thus providing an outlet for gas from the container 58. A second vertical tube 62 fits within the other aperture and terminates at its lower end within the container below the normal liquid level to prevent the by-passing of gas. The upper ends of the vertical tubes 61 and 62 fit within the ends of the respective legs 63 and 64 of an inverted U-shaped cross passage 65 in a head member 66, which also may be a casting, disposed above the container 58 in spaced relation thereto. The tubes 61 and 62 may be secured to the head member 66 and to the container 58 in any desired manner, although best results have been obtained with welded or brazed joints.

A gas discharge conduit 67, which extends down through an aperture in the top of the casting 66 into the tubular chamber formed by the leg 64 and the tube 62 in spaced relation to the walls of the chamber, terminates in a beveled open lower end providing a downwardly opening entrance or gas outlet 68 arranged a substantial distance below the cross passage 65. The upper end of the discharge conduit 67 outside of the casting 66 is connected to the main 69 into which a pressure relief valve 70 also is connected.

During normal operation, gas, such as acetylene from a generator, enters the inlet passage 59 from the main 71, forces the check valve 60 from its seat and bubbles up through the body of water or other suitable liquid 72 to the outlet provided by the tube 61. Gas then flows up through the conduit comprising the tube 61 and the cross passage 65 and passes through the inlet to the trap chamber formed by the portion of the tube 62 outside the reservoir 61 and the leg 64 of the passage 65, wherein it flows downwardly. When the downwardly flowing gas reaches the entrance 68 of the discharge conduit 67, its velocity is reduced, its direction of flow is reversed abruptly, and it passes upwardly through the conduit 67 to the main 69. Most of the entrained liquid drops out of suspension in the gas when the direction of flow is reversed, and is returned through the tube 62 to the main body of liquid 72. The beveled or tapered lower end of the conduit 67 provides that any liquid which may collect on the walls of the conduit will drip from the end of the conduit only at the lowermost point, thus insuring that the flowing gas will not pick up the separated liquid again. Thus, it is apparent that the conduit 67 and the upper portion of the tube 62 form a liquid trap outside of the reservoir 58, and that this trap has an outlet conduit for liquid in communication with the reservoir.

The container 58 may be filled with liquid to the normal level through the filling opening 73 in the side wall of the container, which is closed by a removable plug. Liquid may be drained simultaneously from the container 58 and the inlet passage 59 through separate drain ducts or passages 74 and 75, respectively, opening into an internally threaded single common drain passage which is normally closed by a threaded plug 76. The plug 76 has a tapered inner end which fits in and closes the passage 75, thereby preventing communication between the two drain ducts 74 and 75. A lock nut 77 on the outer end of the plug 76 compresses a gasket 78 against the outside wall of the container 58 to stop liquid from leaking out. When liquid is to be drained out, it is only necessary to remove the plug 76, thereby opening the common drain passage and the duct 75.

Back-flashes are arrested by the check valve 60 and the liquid seal 72 in the same way as in the arrester of Fig. 3, any excessive pressure being relieved by the venting of gas through the relief valve 70.

From the foregoing description, it is evident that there have been provided simple yet efficient and dependable hydraulic back-pressure arresters wherein the loss of sealing liquid is reduced to a minimum, and wherein all parts requiring frequent cleaning or repair are easily accessible.

What is claimed is:

1. A hydraulic back-pressure arrester comprising a reservoir having a portion adapted to contain a body of liquid at a normal level, said reservoir having an inlet for gas below such normal level, and an outlet for gas spaced from said liquid-containing portion; a check valve controlling said inlet so constructed and arranged as to prevent the back flow of fluid therethrough; a liquid trap outside of said reservoir having an outlet for liquid in communication with said reservoir, said trap also having an outlet for gas; and means establishing communication between the outlet of said reservoir and said trap for conducting gas to said trap.

2. A hydraulic back-pressure arrester comprising an inlet reservoir having an inlet for gas; a main reservoir having a portion adapted to contain liquid at a predetermined normal level; conduit means communicating between said inlet reservoir and said main reservoir, and opening into said main reservoir below the normal level of such liquid; a check valve preventing the reverse flow of fluid through said conduit means to said inlet reservoir; a liquid trap outside of said main reservoir having gas outlet means and liquid outlet means; conduit means opening from said main reservoir at a point spaced from such liquid-containing portion and communicating between said main reservoir and said trap for conducting gas to said trap; and conduit means communicating between the liquid outlet means of said trap and said main reservoir.

3. A hydraulic back-pressure arrester comprising an inlet reservoir having an inlet, and an outlet below said inlet; a main reservoir having an outlet, and an inlet below said outlet, said main reservoir being adapted to contain liquid at a level above said last-named inlet; a conduit communicating between the outlet of said inlet reservoir and the inlet of said main reservoir; a check valve in said conduit adapted to be held open by the normal flow of gas and to be closed by back pressure; an outlet reservoir adapted to contain liquid, said outlet reservoir having a gas outlet, and a liquid outlet below said gas outlet; a second conduit communicating between the outlet of said main reservoir and said outlet reservoir, said conduit extending into said outlet reservoir and terminating below the gas outlet thereof and above the liquid level therein; a third conduit communicating between the liquid outlet of said outlet reservoir and the inlet of said main reservoir; and a normally closed check valve in said third conduit adapted to open when the pressure on the side thereof toward said outlet reservoir becomes greater than the pressure on the opposite side thereof.

4. A hydraulic back-pressure arrester as claimed in claim 3, also comprising means for filling said main reservoir and said outlet reservoir with liquid to predetermined levels.

5. A hydraulic back-pressure arrester as claimed in claim 3, also comprising means for relieving excess pressure in said arrester.

6. A hydraulic back-pressure arrester as claimed in claim 3, also comprising screen means arranged to break up a stream of gas discharged into said main reservoir through the inlet thereof whereby such gas will pass upwardly through such liquid in well-dispersed small bubbles.

7. A hydraulic back-pressure arrester comprising an inlet reservoir having an inlet, and an outlet below said inlet; a main reservoir having an outlet, and an inlet below said outlet, said main reservoir being adapted to contain liquid at a level intermediate said last-named inlet and outlet; a conduit communicating between the outlet of said inlet reservoir and the inlet of said main reservoir; a check valve in said conduit adapted to be closed by back pressure; a liquid trap having a gas outlet and a liquid outlet; a conduit communicating between the outlet of said main reservoir and said trap for conducting gas to the latter; a conduit communicating between the liquid outlet of said trap and said main reservoir for returning trapped liquid to the latter; a check valve in said last-named conduit for preventing the flow of liquid from said main reservoir to said trap, said check valve being adapted to permit the flow of fluid through said last-named conduit from said trap when the pressure on the side of said check valve toward said trap exceeds the pressure on the opposite side thereof; a screen in said main reservoir below the liquid level therein arranged so that gas from said first-named conduit will pass therethrough; means providing an opening in said arrester; a plug engaged in said opening; and a support member secured to said plug and to said screen, said screen and said support member being removable through said opening as a unitary assembly with said plug.

8. In a hydraulic back-pressure arrester, a reservoir adapted to contain liquid, said reservoir having an outlet, and an inlet below the level of such liquid; a conduit communicating with said inlet; a check valve controlling said inlet so constructed and arranged as to prevent the back flow of fluid therethrough; a screen member arranged in said reservoir below the liquid level therein so that gas from said inlet will pass through said screen member; means providing an opening adjacent to the bottom of said arrester for drawing liquid therefrom; a plug engaged in said opening; and a support member secured to said plug and to said screen member, said screen member and said support member being removable through said opening as a unitary assembly with said plug.

9. A hydraulic back-pressure arrester comprising a reservoir having a portion adapted to contain a body of liquid at a normal level, and an inlet for gas below such level; a check valve in said reservoir adapted to prevent the backflow of fluid through said inlet; means providing a chamber outside of said reservoir; a conduit establishing communication between the lower portion of said chamber and said reservoir below such level for returning trapped liquid to said reservoir; a conduit for conducting gas from a portion of said reservoir spaced from said liquid-containing portion, said conduit having an end in said chamber arranged to discharge gas downwardly therein; and said chamber having an outlet for gas above said end of said conduit.

10. A hydraulic back-pressure arrester comprising a reservoir having a portion adapted to contain a body of liquid at a normal level, said reservoir having an inlet for gas below such liquid level; means providing a tubular chamber having an open lower end terminating in said reservoir below such liquid level, said chamber having an inlet for gas above said lower end, a conduit establishing communication between said last-named inlet and a portion of said reservoir spaced from said liquid-containing portion; and a conduit for conducting gas from said chamber, said last-named conduit having a downwardly opening entrance in said chamber below said last-named inlet.

11. A hydraulic back-pressure arrester comprising a container adapted to contain a body of liquid at a normal level; a gas supply conduit opening into said container adjacent to the bottom thereof; a check valve in said supply conduit; a head member above said container in spaced relation thereto, said head member having a cross passage therein; a tube secured to said head member and to said container, said tube establishing communication between the upper portion of said container and one side of said cross passage for conducting gas to the latter; a second tube secured to said head member and to said container in communication at its upper end with the other side of said cross passage, said second tube having an open lower end terminating in the lower portion of said container below such normal liquid level; and a gas discharge conduit secured to said head member and extending downwardly within said second tube in spaced relation to the inner wall thereof, said discharge conduit having a downwardly opening entrance below said cross-passage.

12. A hydraulic back-pressure arrester comprising a reservoir; an inlet for gas adjacent to the bottom of said reservoir; an outlet for gas adjacent to the top of said reservoir; a check valve controlling said inlet; a liquid trap comprising a chamber having an outlet for gas; a conduit connecting the outlet of said reservoir to said chamber, said conduit extending downwardly in said chamber below the gas outlet of the latter; and a second conduit connecting together said chamber and said reservoir adjacent to the lower ends thereof; said liquid trap being provided with a filling spout the upper level of which is higher than said second conduit.

13. In a hydraulic back-pressure arrester, a reservoir adapted to contain liquid; a gas inlet passage for introducing gas into said reservoir below the level of such liquid; a check valve between said inlet passage and said reservoir; a single drain passage for draining liquid from said reservoir and said inlet passage simultaneously; separate drain ducts leading from said reservoir and said inlet passage to said single drain passage; and means in said single drain passage normally closing the same and also closing one of said drain ducts, thereby preventing communication between said drain ducts, said last-named means being operable to open said drain passage and said closed drain duct for draining liquid from said reservoir and said inlet passage.

14. A hydraulic back-pressure arrester having a reservoir adapted to contain a body of liquid, said reservoir having a gas inlet below the level of such body of liquid and a gas outlet above such level; a check valve controlling said inlet so constructed and arranged as to prevent the back flow of fluid therethrough; a trap chamber; a conduit establishing communication between a lower portion of said chamber and said reservoir for returning trapped liquid to the latter; a first conduit extending downwardly in said chamber in spaced relation to the wall thereof and having an open lower end; and a second conduit connected into said chamber above said open lower end, one of said conduits being in communication with said gas outlet of said reservoir, the other of said conduits acting to conduct gas from said chamber.

15. In a hydraulic back-pressure arrester, a reservoir having a portion adapted to contain a body of liquid, said reservoir having a gas outlet spaced from said liquid-containing portion, and a gas inlet below the level of such body of liquid; a conduit for supplying gas to said inlet, said conduit having an opening therein aligned with said inlet; a tubular screen arranged in said inlet and extending into said reservoir, said screen having an open lower end, perforate side walls, and an imperforate closure adjacent to the upper end thereof; a plug removably secured in said opening; and a rod secured to said imperforate closure and to said plug, said rod passing through said screen in spaced relation to the side walls thereof and projecting through said open lower end; said screen and said rod being removable from said arrester through said inlet and said opening as a unitary assembly with said plug.

16. A hydraulic back-pressure arrester comprising a reservoir having a portion adapted to contain a body of liquid, said reservoir having a gas inlet below the normal level of such body of liquid, and a gas outlet spaced from said liquid-containing portion; a check valve controlling said inlet so constructed and arranged as to prevent the back flow of fluid therethrough; a liquid trap having a liquid outlet and a gas outlet; a conduit establishing communication between the gas outlet of said reservoir and said trap for conducting gas to said trap; and a conduit establishing communication between said liquid outlet and said reservoir below the level of such body of liquid.

17. A hydraulic back-pressure arrester comprising a reservoir having a portion adapted to contain a body of liquid, said reservoir having a gas inlet below the normal level of such body of liquid, and a gas outlet spaced from said liquid-containing portion; a liquid trap having a liquid outlet and a gas outlet; a conduit establishing communication between said gas outlet of said reservoir and said trap for conducting gas to said trap; a conduit establishing communication between said liquid outlet and said reservoir for returning trapped liquid to the latter; and a normally closed check valve in said last-named conduit adapted to open when the pressure on the side thereof toward said liquid trap becomes greater than the pressure on the opposite side thereof.

18. A hydraulic back-pressure arrester comprising a reservoir having a portion adapted to contain a body of liquid, said reservoir having a gas inlet below the normal level of such body of liquid, and a gas outlet spaced from said liquid-containing portion; means providing a chamber having a wall, the lower portion of said chamber being in communication with said reservoir for returning liquid thereto, the upper portion of said chamber having a gas inlet; a conduit establishing communication between said gas outlet of said reservoir and said gas inlet of said chamber; and a conduit for discharging gas from said chamber extending downwardly therein in spaced relation to said wall, and having the lower end thereof below said gas inlet of said chamber, said lower end being tapered.

19. A hydraulic back-pressure arrester comprising a main reservoir having a portion adapted to contain a body of liquid, said main reservoir having a gas inlet below the normal level of such body of liquid, and a gas outlet spaced from said liquid containing portion; an outlet reservoir adapted to contain liquid, said outlet reservoir having a gas outlet, and a liquid outlet below said gas outlet; a conduit communicating between the outlet of said main reservoir and said outlet reservoir, said conduit extending into said outlet reservoir and terminating below the gas outlet thereof and above the liquid level therein; a conduit establishing communication between said liquid outlet and said main reservoir for returning trapped liquid to the latter; and a normally closed check valve in said last-named conduit adapted to open when the pressure on the side thereof toward said liquid trap becomes greater than the pressure on the opposite side thereof.

20. A hydraulic back-pressure arrester comprising a reservoir having a portion adapted to contain a body of liquid, said reservoir having a gas inlet below the normal level of such body of liquid, and a gas outlet spaced from said liquid containing portion; a gas supply conduit connected into said inlet; a liquid trap having a liquid outlet and a gas outlet; a conduit establishing communication between said gas outlet of said reservoir and said trap for conducting gas to said trap; a conduit establishing communication between said liquid outlet and said inlet of said reservoir for returning trapped liquid to said reservoir; and a normally closed check valve in said last-named conduit adapted to open when the pressure on the side thereof toward said liquid trap becomes greater than the pressure on the opposite side thereof.

MAURICE P. DE MOTTE.

CERTIFICATE OF CORRECTION.

Patent No. 2,352,256.                                                June 27, 1944.

MAURICE P. DE MOTTE.

It is hereby certified that error appears in the printed specification of the above numbered patent requiring correction as follows: Page 2, first column, line 35, after the word "arranged" insert --below the liquid level--; and second column, line 15, after "of" insert --the--; page 4, second column, line 68, claim 8, for "drawing" read --draining--; page 5, first column, line 22, claim 10, after "end" strike out the comma and insert instead a semicolon; and that the said Letters Patent should be read with this correction therein that the same may conform to the record of the case in the Patent Office.

Signed and sealed this 5th day of September, A. D. 1944.

Leslie Frazer (Seal)                                          Acting Commissioner of Patents.